United States Patent
Prieto et al.

(10) Patent No.: US 11,661,503 B2
(45) Date of Patent: *May 30, 2023

(54) CROSS-LINKABLE POLYOLEFIN COMPOSITION COMPRISING A FIRST AND A SECOND OLEFIN POLYMER

(71) Applicant: BOREALIS AG, Vienna (AT)

(72) Inventors: Oscar Prieto, Stenungsund (SE); Denis Yalalov, Stenungsund (SE); Massimiliano Mauri, Västra Frölunda (SE); Christian Müller, Gothenburg (SE); Anna Peterson, Gothenburg (SE)

(73) Assignee: BOREALIS AG, Vienna (AT)

( * ) Notice: Subject to any disclaimer, the term of this patent is extended or adjusted under 35 U.S.C. 154(b) by 106 days.

This patent is subject to a terminal disclaimer.

(21) Appl. No.: 17/056,854

(22) PCT Filed: May 23, 2019

(86) PCT No.: PCT/EP2019/063399
§ 371 (c)(1),
(2) Date: Nov. 19, 2020

(87) PCT Pub. No.: WO2019/224334
PCT Pub. Date: Nov. 28, 2019

(65) Prior Publication Data
US 2021/0238399 A1    Aug. 5, 2021

(30) Foreign Application Priority Data
May 23, 2018  (EP) .................................... 18173778

(51) Int. Cl.
*C08L 23/08*    (2006.01)
*C08J 3/00*     (2006.01)
*C08J 3/24*     (2006.01)
*C08L 23/06*    (2006.01)

(52) U.S. Cl.
CPC .......... *C08L 23/0884* (2013.01); *C08J 3/005* (2013.01); *C08J 3/246* (2013.01); *C08L 23/06* (2013.01); *C08J 2323/06* (2013.01); *C08J 2323/08* (2013.01); *C08J 2423/06* (2013.01); *C08J 2423/08* (2013.01); *C08L 2203/202* (2013.01); *C08L 2205/025* (2013.01); *C08L 2205/035* (2013.01); *C08L 2205/05* (2013.01); *C08L 2207/04* (2013.01); *C08L 2207/066* (2013.01); *C08L 2312/00* (2013.01)

(58) Field of Classification Search
CPC .... C08L 23/0884; C08L 23/0869; C08J 3/246
See application file for complete search history.

(56) References Cited

U.S. PATENT DOCUMENTS

| | | | | |
|---|---|---|---|---|
| 4,855,363 A * | 8/1989 | Moteki | ................ | C08L 23/025 525/196 |
| 4,925,901 A | 5/1990 | Bertram et al. | | |
| 5,539,075 A | 7/1996 | Gustafsson et al. | | |
| 2011/0240330 A1 | 10/2011 | Gervat et al. | | |
| 2012/0220699 A1 * | 8/2012 | Choudhery | ............. | C09D 5/02 524/517 |
| 2013/0220666 A1 * | 8/2013 | Fagrell | ..................... | C08K 5/42 174/120 SR |
| 2014/0329091 A1 * | 11/2014 | Cogen | ................... | B05D 1/265 428/394 |
| 2018/0051151 A1 * | 2/2018 | Ichiki | ........................ | C08J 9/34 |

FOREIGN PATENT DOCUMENTS

| | | |
|---|---|---|
| CN | 102471575 B | 5/2012 |
| CN | 102666615 A | 9/2012 |
| CN | 102859863 A | 1/2013 |
| CN | 103025820 A | 4/2013 |
| EP | 0247357 A1 | 12/1987 |
| EP | 0750319 A1 | 12/1996 |
| EP | 2444980 B1 | 3/2014 |
| EP | 2318210 B1 | 4/2014 |
| FR | 2498609 B1 | 12/1985 |
| FR | 2569411 B1 | 11/1986 |
| FR | 2569412 B1 | 11/1986 |
| FR | 2956405 A1 | 8/2011 |
| JP | 06116362 A | 4/1994 |
| WO | 2010040964 A1 | 4/2010 |
| WO | 2013091575 A1 | 6/2013 |
| WO | 2017000121 A1 | 1/2017 |

OTHER PUBLICATIONS

International Search Report and Written Opinion in PCT/EP2019/063399. dated Jul. 25, 2019. 13 pages.
Encyclopedia of Polymer Science and Engineering, vol. 6 (1986), pp. 383-410.
Encyclopedia of Materials: Science and Technology, 2001 Elsevier Science Ltd.: Polyethylene: High-pressure, R. Klimesch, D.Littmann and F.-O. Mähling pp. 7181-7184.

* cited by examiner

Primary Examiner — Jeffrey C Mullis
(74) Attorney, Agent, or Firm — Meunier Carlin & Curfman LLC

(57) ABSTRACT

The present invention relates to a cross-linkable polyolefin composition comprising a first olefin polymer (A) comprising a first comonomer comprising epoxy groups, and a second olefin polymer (B) comprising a second comonomer comprising carboxylic acid groups and/or precursor thereof.

10 Claims, No Drawings

CROSS-LINKABLE POLYOLEFIN COMPOSITION COMPRISING A FIRST AND A SECOND OLEFIN POLYMER

CROSS REFERENCE TO RELATED APPLICATIONS

This Application is a United States National Phase Patent Application of International Patent Application Number PCT/EP2019/063399, filed on May 23, 2019, which claims the benefit of priority to EP Application No. 18173778.4, filed May 23, 2018.

TECHNICAL FIELD

The present invention relates to a cross-linkable polyolefin composition comprising a first olefin polymer (A) comprising a first comonomer comprising epoxy groups, and a second olefin polymer (B) comprising a second comonomer comprising carboxylic acid groups, a cable comprising at least one layer comprising such a polyolefin composition, and a process for manufacturing such a polyolefin composition.

BACKGROUND OF THE INVENTION

Polyethylenes produced in a high pressure (HP) process are widely used in demanding polymer applications wherein the polymers must meet high mechanical and/or electrical requirements. For instance in W&C applications, e.g. power cable applications, e.g., in low voltage (LV), medium voltage (MV), high voltage (HV) and extra high voltage (EHV) applications, the mechanical and the electrical properties of polyethylenes, and of polymer compositions comprising polyethylenes, have significant importance.

Furthermore, the electrical properties, which are of importance, may differ in different cable applications, as is the case between AC and DC cable applications.

Further, it is also known that cross-linking of polymers, e.g. polyethylenes, substantially contributes to an improved heat and deformation resistance, mechanical strength, chemical resistance and abrasion resistance of a polymer. Therefore, cross-linked polymers are widely used in different end applications, such as in the mentioned W&C applications.

Furthermore, in cable applications, an electric conductor is usually coated first with an inner semiconducting layer, followed by an insulating layer and an outer semiconducting layer. To these layers, further layer(s) may be added, such as screen(s) and/or auxiliary barrier layer(s), e.g. one or more water barrier layer(s) and one or more jacketing layer(s).

Due to benefits mentioned herein, which are achievable with cross-linking, the insulating layer and the semiconducting layers in cable applications are typically made using cross-linkable polymer compositions. The polymer compositions in a formed layered cable application are then cross-linked.

Furthermore, such cross-linkable polymer compositions comprising low density polyethylene (LDPE), are today among the predominant cable insulating materials for power cables.

The cross-linking can be performed with cross-linking agents where the cross-linking agents decompose generating free radicals. Such cross-linking agents, e.g. peroxides, are conventionally added to the polymeric material prior to, or during, the extrusion of the cable. Said cross-linking agent should preferably remain stable during the extrusion step.

The extrusion step should preferably be performed at a temperature low enough to minimize the early decomposition of the cross-linking agent, but high enough to obtain proper melting and homogenisation of the polymer composition. If a significant amount of cross-linking agent, e.g. peroxide, decomposes already in the extruder, and thereby initiates premature cross-linking, it will result in formation of so-called "scorch", i.e. inhomogeneity, surface unevenness and possibly discolouration in the different layers of the resultant cable. Therefore, any significant decomposition of cross-linking agents, i.e. free radical forming agents, during extrusion should be avoided. Instead, the cross-linking agents should ideally decompose merely in a subsequent cross-linking step at elevated temperature. The elevated temperature will increase the decomposition rate of the cross-linking agents and will thus increase cross-linking speed, and a desired, i.e. a target, cross-linking degree may be reached faster.

Moreover, when a polymer composition in, for example, a cable, is cross-linked, the decomposition of the cross-linking agents, e.g. peroxides, during the cross-linking, will further also result in formation of peroxide decomposition products. Some of the peroxide decomposition products are volatile, and their main component is methane if the types of peroxides that typically are used for cross-linking in relation to, for example, a cable, are used. The peroxide decomposition products remain mostly captured within the polymer composition of, for example, a cable, after cross-linking. This may cause problems in view of the cable manufacturing process as well as in view of the quality of the final cable.

Especially MV, HV and EHV power cables must have layers of high quality in order to improve safety during installation and in end uses of said cables. In installation, for example, it is of importance to avoid that captured decomposition products e.g. flammable methane, ignite, for example when end caps are removed. In service, volatile peroxide decomposition products formed in a cable during a cross-linking step can create a gas pressure and thus cause defects in the shielding and in the joints. E.g. when a cable core is equipped with a metal barrier, then the gaseous products can exert a pressure, especially on the joints and terminations, whereby a system failure may occur. Thus, the level of these volatile peroxide decomposition products needs to be reduced, to a low enough level, before subsequent cable production steps can take place.

A low enough level of the volatile peroxide decomposition products renders a use of the polymer composition comprising LDPE safe for use in installations, such as cable installations, and with accessories, such as cable accessories. Thus, today a so called degassing step, which reduces the level of volatile peroxide decomposition products, is needed in cable production process. The degassing step is a time and energy consuming and thus costly operation in a cable manufacturing process. Degassing requires large heated chambers, which must be well ventilated to avoid the build-up of e.g. flammable methane. The cable core, i.e. layers and conductor, typically wound onto cable drums, is normally held in said degassing step at elevated temperature in the range of 50-80° C., e.g. 60-70° C., for lengthy time periods. When exposed to the required temperatures, thermal expansion and softening of the insulation can occur and lead to unwanted deformation of the formed cable layers resulting directly to failures of the cable. The degassing of HV and EHV cables with high cable weight needs thus often to be carried out at decreased temperatures which prolongs the degassing time further.

Further, the cross-linking of a polymer composition, comprised in, for example, a cable, substantially contributes to the improved heat and deformation resistance, mechanical strength, chemical resistance and abrasion resistance of the polymer composition and the cable comprising the polymer composition.

In this context see U.S. Pat. No. 5,539,075, which relates to a method of producing an unsaturated copolymer of ethylene and at least one monomer, wherein the monomer is a polyunsaturated compound and copolymerisable with ethylene.

See also EP2318210, which relates to a polymer composition comprising an unsaturated LDPE copolymer of ethylene with one or more polyunsaturated comonomers and being suitable for cross-linked polymer applications. The polymer composition has a melt flow rate under 2.16 kg load, MFR2, of at least 2.8 g/10 min, and contains carbon-carbon double bonds in an amount of at least 0.40 carbon-carbon double bonds/1 000 carbon atoms.

WO2017/000121 describes the crosslinking of an epoxy functional copolymer and a carboxylic acid functional based copolymer in the presence of a peroxide initiator.

In order to avoid volatile by-products, thus eliminating the need for a degassing step, click-chemistry type curing of polyethylene may be used, e.g. cross-linking of epoxy-functionalized resins using a variety of bifunctional curing agents such as aromatic and aliphatic di-amines, di-carboxylic acids and di-phenols.

WO2013/091575 describes the crosslinking of an epoxy functional copolymer and a carboxylic acid functional based copolymer in the presence of a curing agent.

However, the curing agents mentioned above present their own drawbacks, in particular regarding toxicity, handling, storage, moisture resistance and cost. Further, it has been found that cross-linking using the curing agents mentioned above results in a discoloured final product, having yellow to orange colour rather than being colourless. Moreover, any unreacted curing agent or Lewis acid left after the cross-linking step will negatively affect electric properties.

Accordingly, there is a need to find new solutions to overcome the problems of the state of the art.

In view of the above, the object of the present invention is providing a cross-linkable polyolefin composition that may be cross-linked without the need for curing agents that may generate by-products.

Moreover, it is an object of the present invention to provide a polyolefin composition, in particular for the insulation layer of a power cable, which cross-links at a moderate temperature and short time at a high cable line speed.

SUMMARY OF THE INVENTION

The present invention therefore provides a cross-linkable polyolefin composition comprising a first olefin polymer (A) comprising a first comonomer comprising epoxy groups, and a second olefin polymer (B) comprising a second comonomer comprising carboxylic acid groups and/or precursor thereof. In one embodiment, the polyolefin composition consists of said first olefin polymer (A) and second olefin polymer (B).

In one embodiment the invention provides a cable comprising at least one layer comprising a cross-linkable polyolefin composition comprising:
  20 wt % to 95 wt % based on the total amount of said polyolefin composition of a first olefin polymer (A) comprising a first comonomer comprising epoxy groups, and
  5 to 60 wt % based on the total amount of said polyolefin composition of a second olefin polymer (B) comprising a second comonomer comprising carboxylic acid groups and/or precursor thereof;
  wherein the cross-linkable polyolefin composition is substantially free of curing agents.

In one embodiment the invention provides, a polyolefin composition comprising:
  20 wt % to 95 wt % based on the total amount of said polyolefin composition of a first olefin polymer (A) comprising a first comonomer comprising epoxy groups, and
  5 to 60 wt % based on the total amount of said polyolefin composition of a second olefin polymer (B) comprising a second comonomer comprising carboxylic acid groups and/or precursor thereof;
  wherein the crosslinked polyolefin composition is substantially free of curing agents;
  which has been crosslinked.

By the term "precursor" is meant a chemical moiety or functional group that may be transformed into another moiety or functional group, in this case into a carboxylic acid. Precursors of carboxylic acid will be described in greater detail below.

According to the present invention, the second olefin polymer (B) is used as curing agent for cross-linking with the first olefin polymer (A). It has been demonstrated that the second olefin polymer (B) bearing carboxylic acid groups and/or precursor thereof can be effectively used to cure the first olefin polymer (A) bearing epoxy groups, leading to rapid network formation, generating covalent cross-links between epoxy functions at reasonably low temperature and without formation of volatile by-products. The concept of using two olefin based copolymers bearing compatible organic functionalities that can react with each other upon heating without releasing any undesired or volatile by-product can be a breakthrough in power cable insulation industry: the absence of undesired organic molecules throughout the compounding, extrusion and cross-linking process makes this type of chemistry safe in an industrial environment as well as economically and technically appealing for curing of insulation materials during cable extrusion.

As described above, an object of the present invention is providing a cross-linkable polyolefin composition that may be cross-linked without the need for (external) curing agents, that may generate by-products. In one embodiment therefore, the polyolefin composition is substantially free of curing agents. The term "substantially free" as used herein indicates that the total amount of curing agents in the polyolefin composition is less than 0.01 wt % based on the total amount of said polyolefin composition. Ideally, the polyolefin composition is free of curing agents. Curing occurs in the present invention simply via the reaction of the second olefin polymer (B) with the first olefin polymer (A) in the absence of external curing agents.

As used herein, the term "curing agent" should be taken as meaning any species (other than the second olefin polymer (B) or the first olefin polymer (A) themselves) which facilitates, or is involved in, the curing reaction between the first and second olefin polymers. Curing agents include, but are not limited to, nucleophilic catalysts, tertiary amines, amine complexes, urea derivatives, imidazoles, substituted imidazoles, Lewis bases having the ability to catalyze curing, and mixtures thereof. The curing agent may be a crosslinking catalyst, such as a catalyst compound containing amine, phosphine, heterocyclic nitrogen, ammonium, phosphonium, arsonium, sulfonium moieties, or any combination thereof. For example, the curing agent may be ethyltriphenylphosphonium; benzyltrimethylammonium chloride; heterocyclic nitrogen-containing catalysts described in U.S. Pat. No. 4,925,901; imidazoles; triethylamine; or any combination thereof. For example, the curing agent may be selected from the group consisting of tertiary amines, 1-substituted imidazoles, organo-phosphines, and acid salts. The curing agent may be a tertiary amine such as, for example, triethylamine, tripropylamine, tributylamine, 1-methylimidazole, benzyldimethylamine, and mixtures thereof.

In one embodiment, curing agents include bifunctional curing agents such as aromatic and aliphatic di-amines, di-carboxylic acids and di-phenols. The curing agent may be 1-methylimidazole. An example of a commercially available curing agent is Tinuvin® 765, available from BASF, which is a mixture of bis(1,2,2,6,6-pentamethyl-4-piperidyl) sebacate (70-90 wt %) and methyl 1,2,2,6,6-pentamethyl-4-piperidyl sebecate (15-30 wt %) (CAS Numbers: 41556-26-7; 8291-37-7).

As used herein, the term "curing agent" also includes crosslinking agents, such as free radical initiators such as azides or peroxides. In one embodiment therefore, the polyolefin composition is substantially free of free radical initiators such as azides or peroxides.

As to the first olefin polymer (A) containing epoxy groups, the expression means an olefin polymer wherein a unit containing epoxy group is incorporated. Such unit is referred herein as an "epoxy-group-containing monomer unit" and means an unsaturated compound comprising an epoxy group, preferably vinyl group containing compound bearing an epoxy group. Such compounds can be used as comonomers for copolymerising epoxy-containing monomers units to the first olefin polymer (A) or can be grafted to the first olefin polymer (A), as well known in the polymer field. Grafting and copolymerizing of epoxy-group containing monomer units can be made according to or analogously to the methods described in the literature. The olefin polymers (A) containing epoxy groups as well as the epoxy-group-containing monomer units are very well known (mentioned e.g. in JP 06-116362 of Nippon Petrochem Co. LTD and WO 2010040964 of Arkema France) and commercially available. As preferable examples of epoxy-containing monomer units, e.g. aliphatic esters and glycidyl ethers such as an allyl glycidyl ether, a vinyl glycidyl ether, a maleate or itaconate of glycidyl, a (meth)glycidyl acrylate, and alicyclic esters and glycidyl ethers, such as a 2-cyclohexene-1-glycidylether, a cyclohexene-4,5-diglycidyl carboxylate, a cyclohexene-4 glycidyl carboxylate, a 5-norbornene-2-methyl-2-glycidyl carboxylate and a endo cis-bicyclo (2,2, 1)-5-heptene-2,3-diglycidyl dicarboxylate, can be mentioned.

In the present invention, the epoxy-containing monomer unit is preferably incorporated as a comonomer, i.e. by copolymerising an olefin monomer with the vinyl group containing comonomer bearing an epoxy group (=epoxy-group-containing monomer unit).

Most preferably, the epoxy-group-containing monomer units are glycidyl methacrylate comonomer units.

Preferably, the amount of epoxy-group-containing monomer units is at least 0.1 wt %, more preferably at least 0.5 wt %, more preferably at least 1 wt %, based on the amount of first olefin polymer (A).

The content of epoxy-group-containing monomer units is preferably 20 wt % or less, preferably 15 wt %, more preferably 10 wt % or less and most preferably 5 wt % or less, based on the amount of the first olefin polymer (A).

The suitable first olefin polymer (A) can be a homopolymer or a copolymer of an olefin, wherein the epoxy-group-containing monomer units are grafted as defined above, or a copolymer of an olefin and at least the epoxy-group-containing monomer units as defined above. Preferred first olefin polymer (A) is a copolymer of an olefin with at least the epoxy-group-containing monomer units as defined above, more preferably a copolymer of an olefin with at least glycidyl methacrylate comonomer units.

The first olefin polymer (A) may comprise further comonomer(s) different from epoxy-group containing monomer units, and if present, then preferably further polar comonomer(s) different from epoxy-group containing monomer units. In case the first olefin polymer (A) comprises further polar comonomer(s), then the further polar comonomer(s) are preferably present in an amount of at least 5.0 wt %, more preferably of at least 8 wt %, more preferably of at least 12 wt % based on the amount of the first olefin polymer (A). In case first olefin polymer (A) comprises polar comonomers, then, preferably, the polar group containing monomer units are present in an amount of not more than 50 wt %, more preferably not more than 45 wt %, even more preferably of not more than 40 wt %, even more preferably not more than 35 wt %, even more preferably not more than 25 wt %, and most preferably of not more than 20 wt % based on the amount of the first olefin polymer (A).

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention, the term "alkyl (meth)acrylate comonomer units" encompasses alkyl acrylate comonomer units and/or alkyl methacrylate comonomer units.

The alkyl moiety in the alkyl(meth)acrylate comonomer units may be selected from C1 to C8-hydrocarbyls, whereby the hydrocarbyl may be branched or linear. In particular, the alkyl moiety is C3 or C4 hydrocarbyl, wherein the C3 or C4 hyrdocarbyl may be linear or branched.

According to the present invention, the first olefin polymer (A) may be a polyethylene comprising epoxy-groups-containing monomer units, more preferably a copolymer of ethylene with at least the epoxy-group-containing monomer units as defined above, more preferably with at least glycidyl methacrylate comonomer units.

The copolymer of ethylene with at least the epoxy-group-containing monomer units as the first olefin polymer (A) is referred herein also shortly as ethylene/epoxy copolymer.

As mentioned above, the ethylene/epoxy copolymer may further comprise other comonomer units.

Thus, the first olefin polymer (A) may be a copolymer of ethylene with at least epoxy-groups comprising comonomer and other comonomer(s), different from epoxy-group containing monomer units, which other comonomer is preferably a polar comonomer different from epoxy-group containing monomer units, more preferably an acrylate or acetate group containing comonomer units.

In the context of the present invention, the first polymer (A) comprising comonomer bearing epoxy groups may be a blend of at least two polymers each of which comprises comonomer units bearing epoxy functionality. The epoxy functionalities in each of the polymers being a part of the first polymer (A) may be same or different.

In particular, the first olefin polymer (A) may be selected from an ethylene copolymer with glycidyl methacrylate comonomer units, or an ethylene copolymer with glycidyl methacrylate comonomer units and a polar comonomer selected from alkyl(meth)acrylate or a vinyl acetate comonomer units. The polar comonomer units may be selected from methyl acrylate, ethyl acrylate, butyl acrylate.

The first olefin polymer (A) may have a melt flow rate MFR2, determined according to ISO 1133 under a load of 2.16 kg and a temperature of 190° C., of at least 0.1 g/10 min, more preferably of at least 0.5 g/10 min. Further, the first olefin polymer (A) may have a melt flow rate MFR2, determined according to ISO 1133 under a load of 2.16 kg and a temperature of 190° C., of 75 g/10 min or less, more preferably 60 g/10 min or less, even more preferably 55 g/10 min or less.

The first olefin polymer (A) may have a density of from 860 kg/m$^3$ to 960 kg/m$^3$, and preferably of not higher than 955 kg/m$^3$.

The first olefin polymer (A) may be low density ethylene polymer (LDPE) produced in a high pressure (HP) process in a tubular or autoclave reactor or in any combination thereof, both in case the epoxy-group-containing monomer units are grafted to a homopolymer or copolymer of ethylene after the production of the ethylene polymer as olefin polymer (A), and in case the epoxy-group-containing monomer units are copolymerised with ethylene and optionally with other comonomer(s). Hence, in case the epoxy-group containing monomer units are introduced by grafting, the polymer prior to grafting may also be produced by this process. The high pressure (HP) polymerisation is widely described in the literature and the adjustment of process conditions for further tailoring the other properties of the polyolefin depending on the desired end application is within knowledge of a skilled person.

In a tubular reactor, the polymerisation is effected at temperatures which typically range up to 400° C., preferably from 80 to 350° C. and pressure from 70 MPa, preferably 100 to 400 MPa, more preferably from 100 to 350 MPa. Pressure can be measured at least after compression stage and/or after the tubular reactor.

Temperature can be measured at several points along the reactor. Further details of the production of ethylene (co) polymers by high pressure radical polymerization can be found in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available. The polymerization pressure is typically 20 to 300, such as 20 to 250 MPa. The polymerization reaction is exothermic and after startup (at elevated temperature, e.g. from 80 to 150° C. to create the first radicals) the exothermic heat generated sustains the reaction. Temperature in each zone is controlled by the cooled incoming feed mixture. Suitable temperatures range from 80 to 300° C. The process is well known to a skilled person and described e.g. in WO2010040964 of Arkema France, page 11, lines 23-32, and page 12, lines 1-8, or can be produced analogously as described e.g. in FR2498609, FR2569411 and FR2569412. Such autoclave polymerisation is preferred, when ethylene is copolymerized with the epoxy-group-containing monomer as defined above, preferably with glycidyl methacrylate comonomer, and optionally, and preferably, with other comonomer(s), preferably with a polar comonomer as defined above, more preferably alkyl (meth)acrylate, more preferably methyl acrylate, comonomer.

According to the present invention, the amount of the first olefin polymer (A) may be at least 20 wt %, preferably at least 30 wt % and more preferably at least 40 wt % based on the amount of the polyolefin composition. According to the present invention, the amount of the first olefin polymer (A) may be below 95 wt %, preferably below 75 wt %, most preferably below 60 wt % based on the amount of the polyolefin composition.

The second olefin polymer (B) according to the present invention is an olefin polymer comprising a second comonomer comprising carboxylic acid groups and/or precursor thereof.

In the context of the present invention, carboxylic acid groups and groups being precursors of carboxylic acids will hereafter be referred to as "groups bearing carboxylic functionality".

According to the present invention, the second olefin polymer (B) may thus be a copolymer comprising a second comonomer comprising carboxylic acid groups.

As an alternative, the second olefin polymer (B) may be an olefin polymer comprising comonomer units comprising functional groups being precursors of carboxylic acid groups, such as tert-butyl acrylate co-polymer. Such a second polymer (B) may be extruded at elevated temperature (for instance 190° C.) without any pre-cross-linking and would then undergo conversion to carboxylic acid functionalities inside the vulcanization tube to immediately cross-link with the epoxy groups. Among other possible precursors of carboxylic acids, anhydrides may be mentioned, such as maleic anhydride.

Finally, the second olefin polymer (B) may be a terpolymer comprising comonomer units comprising carboxylic acid groups and comonomer units comprising functional groups being precursors of carboxylic acid groups. Such precursor of a carboxylic acid may e.g. be an ester group. In this case, the cross-linking temperature should be sufficiently high such that hydrolysis of the ester is facilitated, and all of the ester groups are converted to carboxylic acid functionalities. An example of such a terpolymer that may be used as the second polymer (B) in the context of the present invention is e.g. a terpolymer comprising tertbutyl acrylate and acrylic acid comonomer units.

The second olefin polymer (B) may comprise further comonomer(s) different from monomer units containing carboxylic acid groups and/or precursors of carboxylic acids. If present, then preferably further polar comonomer(s). In case the second olefin polymer (B) comprises further polar comonomer(s), then the further polar comonomer(s) are preferably present in an amount of at least 5.0 wt %, more preferably of at least 8 wt %, more preferably of at least 12 wt % based on the amount of the second olefin polymer (B). In case first olefin polymer (B) comprises polar comonomers, then, preferably, the polar group containing monomer units are present in an amount of not more than 50 wt %, more preferably not more than 45 wt %, even more preferably of not more than 40 wt %, even more preferably not more than 35 wt %, even more preferably not more than 25 wt %, and most preferably of not more than 20 wt % based on the amount of the second olefin polymer (B).

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention, the term "alkyl (meth)acrylate comonomer units" encompasses alkyl acrylate comonomer units and/or alkyl methacrylate comonomer units.

The alkyl moiety in the alkyl(meth)acrylate comonomer units may be selected from C1 to C8-hydrocarbyls, whereby the hydrocarbyl may be branched or linear. In particular, the alkyl moiety is C3 or C4 hydrocarbyl, wherein the C3 or C4 hydrocarbyl may be linear or branched.

In the context of the present invention, the second polymer (B) comprising comonomer bearing carboxylic acid groups or functional groups being precursors of carboxylic acid groups may be a blend of at least two polymers each of which comprises comonomer units bearing carboxylic acid groups or functional groups being precursors of carboxylic acid groups. The carboxylic acid groups or functional groups being precursors of carboxylic acid groups in each of the polymers being a part of the second polymer (B) may be same or different.

In analogy to the above, the comonomer units of the second olefin polymer (B) may either be copolymerized or grafted into the olefin polymer.

In the present invention, the monomer units bearing carboxylic functionality are preferably incorporated as a comonomer, i.e. by copolymerising an olefin monomer with the vinyl group containing comonomer bearing a carboxylic functionality.

Most preferably, second comonomer used in the second olefin polymer (B) comprises carboxylic acid groups, in particular acrylic acid groups.

The amount of monomer units bearing carboxylic functionality may be at least 0.1 wt %, more preferably at least 0.5 wt %, more preferably at least 1 wt %, based on the amount of second olefin polymer (B).

The content of monomer units bearing carboxylic functionality may be below 20 wt %, preferably below 15 wt %, more preferably below 10 wt % based on the amount of the second olefin polymer (B).

According to the present invention, the second olefin polymer (B) may be a polyethylene comprising monomer units bearing carboxylic functionality, more preferably a copolymer of ethylene with acrylic acid.

The second olefin polymer (B) may have a melt flow rate $MFR_2$, determined according to ISO 1133 under a load of 2.16 kg and a temperature of 190° C., of at least 0.1 g/10 min, more preferably of at least 0.5 g/10 min. Further, the second olefin polymer (B) may have a melt flow rate MFR2, determined according to ISO 1133 under a load of 2.16 kg and a temperature of 190° C., of 75 g/10 min or less, more preferably 60 g/10 min or less, even more preferably 55 g/10 min or less.

The second olefin polymer (B) may have a density of from 860 $kg/m^3$ to 960 $kg/m^3$, and preferably of not higher than 955 $kg/m^3$.

The second olefin polymer (B) may be low density ethylene polymer (LDPE) produced in a high pressure (HP) process in a tubular or autoclave reactor or in any combination thereof, both in case the monomer units bearing carboxylic functionality are grafted to a homopolymer or copolymer of ethylene after the production of the ethylene polymer as olefin polymer (B), and in case the monomer units bearing carboxylic functionality are copolymerised with ethylene. The high pressure (HP) polymerisation is widely described in the literature and the adjustment of process conditions for further tailoring the other properties of the polyolefin depending on the desired end application is within knowledge of a skilled person.

In a tubular reactor, the polymerisation is effected at temperatures which typically range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points along the reactor. Further details of the production of ethylene (co)polymers by high pressure radical polymerization can be found in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available. The polymerization pressure is typically 20 to 300, such as 20 to 250, MPa. The polymerization reaction is exothermic and after startup (at elevated temperature, e.g. from 80 to 150° C. to create the first radicals) the exothermic heat generated sustains the reaction. Temperature in each zone is controlled by the cooled incoming feed mixture. Suitable temperatures range from 80 to 300° C. The process is well known to a skilled person and described e.g. in WO2010040964 of Arkema France, page 11, lines 23-32, and page 12, lines 1-8, or can be produced analogously as described e.g. in FR2498609, FR2569411 and FR2569412.

According to the present invention, the amount of the second olefin polymer (B) may be at least 5 wt %, preferably at least 10 wt %, more preferably at least 15 wt %, even more preferably at least 20 wt % based on the total amount of the olefin polymer composition. According to the present invention, the amount of the second olefin polymer (B) may be below 60 wt %, preferably below 50 wt %, more preferably below 40 wt % based on the total amount of the olefin polymer composition.

The cross-linkable polyolefin composition according to the present invention may further comprise a third olefin polymer (C). The third olefin polymer (C) may be LDPE, HDPE, or may be a polyethylene copolymer. The third olefin polymer (C) may participate in the cross-linking reaction, or may be inert.

Further, the cross-linkable polyolefin composition according to the present invention may be cross-linked, especially when used as a layer in a cable.

After cross-linking, the hotset elongation of the composition may be 175% or less, more preferably 100% or less and most preferably 90% or less, when determined according to "Hotset elongation" as described below under "Measurement methods".

After cross-linking, the gel content of the polyolefin composition of the present invention may be at least 50%, more preferably at least 60% and most preferably at least 70%, as determined according to "Gel Content" as described below under "Measurement methods".

The present invention further relates to a process for manufacturing a cross-linkable olefin polymer composition comprising the steps of:

(1) providing a first olefin polymer (A) comprising a first comonomer comprising epoxy groups;

(2) providing a second olefin polymer (B) comprising a second comonomer comprising carboxylic acid groups;

(3) compounding the first olefin polymer (A) and the second olefin polymer (B) thus obtaining the cross-linkable olefin polymer composition.

The compounding step (3) may be an extrusion step. Alternatively, the process according to the present invention may comprise step (3a) of pelletizing the cross-linkable olefin polymer composition. If such a step is present, then the extrusion will be performed in a subsequent step (3b). The process of the present invention may further comprise step (4) of cross-linking the cross-linkable olefin polymer composition.

The cross-linking step may be carried out at a temperature of at least 150° C., more preferably at a temperature of at least 180° C.

The cross-linking step may be carried out at a temperature of below 360° C., more preferably at a temperature of below 320° C.

The cross-linking process may be carried out at atmospheric pressure. Further, the cross-linking process may be carried out at elevated pressure, e.g. at a pressure of at least 5 bar. Usually, the pressure is not higher than 25 bar.

The cross-linkable polyolefin composition according to the present invention is highly suitable for W&C applications, e.g. in a cable, which is cross-linkable and comprises one or more layers, wherein at least one layer is obtained from the cross-linkable polyolefin composition as described herein. The cable may be a power cable, such as an AC power cable or a DC power cable. The cable layer obtained from the cross-linkable polyolefin composition may be insulation layer.

Further, the cable of the present invention may, for example, be a power cable which comprises at least an inner semiconductive layer, an insulation layer and an outer semiconductive layer in given order, wherein at least the insulation layer is obtained from the cross-linkable polyolefin composition as described herein.

"The power cable" means herein a cable that transfers energy operating at any voltage. The voltage applied to the power cable can be AC, DC or transient (impulse). The multi-layered article may be a power cable operating at voltages higher than 6 kV.

The present invention further relates to a process for producing an article, such as a cable, wherein the process may, for example, comprise at least the steps of:

a0) meltmixing a cross-linkable polyolefin composition as described herein optionally together with further component(s), and a) forming a cable obtained from the polymer composition as described herein.

"Meltmixing" is well known blending method, wherein the polymer component(s) are mixed in an elevated temperature, which is typically above, e.g. at least 20-25° C. above, the melting or softening point of polymer component(s).

Step a) above may be the step of applying on a conductor the cross-linkable polyolefin composition, as described herein, to form at least one of layers surrounding the conductor.

The cross-linkable polyolefin composition, as described herein, may be introduced to step a0) of the process, e.g. in pellet form and mixing, i.e. meltmixing, is carried out in an elevated temperature which melts (or softens) the polymer material to enable processing thereof.

Further, step a) may be a (co)extrusion. The term "(co) extrusion" means herein that in case of two or more layers, said layers can be extruded in separate steps, or at least two or all of said layers can be coextruded in a same extrusion step, as well known in the art.

Step a0) of meltmixing of the cross-linkable polyolefin composition may be performed in a mixer or an extruder, or in any combination thereof, at elevated temperature being below the cross-linking temperature. After a0) meltmixing, e.g. in said extruder, the resulting meltmixed layer material is then, for example, a) (co)extruded on a conductor in a manner very well known in the field. Mixers and extruders, such as single or twins screw extruders, which are used conventionally for cable preparation are suitable for the process of the invention.

The process for producing an article, e.g. a power cable, may further comprise the step of b) cross-linking the at least one cable layer obtained from step a) comprising a cross-linkable polyolefin composition.

It is understood and well known that also the other cable layers and materials thereof, if present, can be cross-linked at the same time, if desired.

In one embodiment, the process does not involve the use of any curing agents, such as peroxides. Unlike peroxide cross-linking, no or only a small amount of volatile by-products are formed during cross-linking Thereby, the safety is improved and furthermore, the production lead time is decreased since an extra processing step, such as degassing step, can be shortened or avoided.

Finally, the problem of storage stability and discolouration is avoided.

The present invention also relates to a cable comprising a conductor surrounded by one or more layer(s), wherein at least one layer comprises, or consists of, a polyolefin composition according to any of the above-described embodiments. Preferably, the at least one layer of the cable comprising, or consisting of, the composition of the invention is selected from an insulation layer, a semiconductive layer or a jacketing layer, preferably from an insulation layer or a semiconductive layer.

The term "surrounded" encompasses that the respective layer is directly attached to the conductor as well as that one or more further layers are present between the respective layer and the conductor.

The term "conductor" as used herein denotes wires of a conductive material for e.g. power, such as metals, or information, such as glass fibers, i.e. the wire(s) may be for any use and be e.g. optical, telecommunication or electrical wire. The conductor may comprise one or more wires. Moreover, the cable may comprise one or more such conductors.

In a preferred embodiment, the cable is a power cable, i.e. the conductor is an electrical conductor and comprises one or more metal wires.

In case a semiconductive layer comprises the polyolefin composition of the invention, then the composition further comprises a conductive filler, preferably carbon black.

The amount of conductive filler is at least such that a semiconducting polyolefin composition is obtained. The amount of conductive filler can vary depending on the type of the used carbon black, the conductivity of the composition and desired end use.

Preferably, the conductive filler, preferably carbon black, is present in an amount of at least 10 wt %, preferably at least 15 wt %, even more preferably at least 20 wt %, yet more preferably at least 30 wt %, and most preferably at least 35 wt % based on the total amount of semiconductive polyolefin composition.

The conductive filler, preferably carbon black, is preferably present in an amount of 50 wt % or less, more preferably 45 wt % or less, and most preferably 40 wt % or less based on the total amount of semiconductive polyolefin composition.

The polyolefin composition may also comprise further additive(s). As possible further additives, colorants, antioxidants, scorch retarders, cross-linking inhibiting agents, stabilizers, processing aids, lubricants, compatibilizers, parting agents, anti-caking agents, flame retardant additives, acid scavengers, inorganic fillers, voltage stabilizers, additives for improving water tree resistance, or mixtures thereof can be mentioned. It will be appreciated that any additive should preferably not act as a curing agent.

DETAILED DESCRIPTION OF THE INVENTION

1. Materials

Below, the materials used in the compositions of the present invention are described. In particular, the polymers (P1-P10) are classified as polymer (A), i.e. a polymer bearing epoxy-groups, polymer (B), i.e. polymer bearing carboxylic acid functionality or its precursor, or polymer (C).

1.1 P1 (A)

P1 is a polymer of ethylene-glycidyl methacrylate having a glycidyl methacrylate content of 8 wt %, an $MFR_2$ (2.16 kg/190° C.) of 5 g/10 min, a density of 940 kg/m³ and a melting point of 106° C., commercially available from Arkema.

1.2 P2 (B)

P2 is an ethylene-methacrylic acid copolymer resin having 7 wt % of methacrylic acid comonomer, a density of 0.93 g/cm³ and $MFR_2$ (190° C./2.16 kg) of 8 g/10 min, commercially available from Dow.

1.3 P3 (C)

P3 is an LDPE homopolymer having $MFR_2$ (190° C./2.16 kg) of 1.9 g/10 min, and density of 0.923 g/cm³.

1.4 P4 (A)

P4 is copolymer of ethylene and glycidyl methacrylate produced in a tubular reactor, having 2 wt % GMA, and $MFR_2$ (190° C./2.16 kg) of 1.9 g/10 min.

1.5 P5 (B)

P5 is a terpolymer of ethylene, tertbutyl methacrylate and acrylic acid, produced in a tubular reactor, having 5.8 wt % TBMA and 5.8 wt % EAA, and $MFR_2$ (190° C./2.16 kg) of 1.5 g/10 min.

1.6 P6 (A)

P6 is a terpolymer of ethylene glycidyl methacrylate/butyl acrylate, produced in a tubular reactor, and having 1.8 wt % GMA, —18 wt % BA, and $MFR_2$ (190° C./2.16 kg) of 6.6 g/10 min.

1.7 P8 (A)

P8 is a polymer of ethylene-glycidyl methacrylate having a glycidyl methacrylate content of 4.5 wt %, an $MFR_2$ (2.16 kg/190° C.) of 2 g/10 min, a density of 930 kg/m³, commercially available from Arkema.

1.8 P9 (C)

P9 is HDPE having density of 962 kg/m³, $MFR_2$ (2.16 kg/190° C.) of 12 g/10 min.

1.9 P10 (B)

P10 is an ethylene-methacrylic acid copolymer resin having 3.1 wt % of methacrylic acid comonomer, and MFR2 (190° C./2.16 kg) of 10.6 g/10 min, commercially available from Dow.

1.10 Ad1

Ad1 is 1,8-diaminooctane, CAS nr. 373-44-4, commercially available from Sigma Aldrich.

1.11 Ad2

Ad2 is trimethylolpropane tris[poly(propylene glycol) amine terminated] ether, CAS nr. 39423-51-3, commercially available from Sigma Aldrich.

1.12 Ad3

Ad3 is 2,2-bis(4-hydroxy-3-methylphenyl)propane, CAS nr. 79-97-0, commercially available from Sigma Aldrich.

1.13 Ti1

Ti1 is tetrakis(2-ethylhexyl) orthotitanate, CAS nr. 1070-10-6, having Mw of 564 g/mol, commercially available from Dorf Ketal.

2. Measurement Methods

Unless otherwise stated in the description or claims, the following methods were used to measure the properties defined throughout the description and the claims. The samples were prepared according to given standards, unless otherwise stated.

2.1 Melt Flow Rate

The melt flow rate was determined according to ISO 1133 for ethylene copolymers at 190° C., at a 2.16 kg load ($MFR_2$).

2.2 Density

Density was measured according to ISO 1183-2. The sample preparation was executed according to ISO 1872-2 Table 3 Q (compression moulding).

2.3 Comonomer Content

Determination of comonomer content is effected using the procedure as described in EP 2 444 980 A1, page 19, line 40 to page 20, line 29.

2.4 Hotset Elongation and Hotset Permanent Deformation

Hotset elongation and permanent deformation are determined on dumbbells prepared according to ISO-527-2-5A. Dumbbells were taken from already cross-linked compressed plaques prepared as described below.

The hotset elongation was determined according to IEC 60811-2-1 on dumbbell samples as prepared as described above. The nature of the samples is specified in context. In the hotset test, a dumbbell of the tested material is equipped with a weight corresponding to 20 N/cm². This specimen was put into an oven at 200° C. and after 5 minutes the elongation was measured. The specimen was then left in the oven with the weight for additional 10 min while the elongation was monitored.

Subsequently, the weight was removed and the specimen was left to recover in the oven for additional 5 min before being extracted. Then, the specimen was taken out from the oven and cooled down to room temperature. The permanent deformation was determined.

2.5 Gel Content

The gel-content of cross-linked samples was determined gravimetrically using a solvent extraction technique. The samples (~150 mg) were placed in pre-weighed 100 mesh stainless steel baskets and extracted in 1.1 dm³ refluxing decalin for 6 h. An antioxidant, 10 g Irganox 1076 from Ciba-Geigy, was added to the solvent to prevent degradation. Then, the solvent was exchanged with 0.9 dm³ of additive free, pre-heated decalin and the extraction continued for 1 h at reflux. Finally, the samples were dried first at ambient overnight and then under vacuum overnight at 50° C. After this period, the non-soluble fraction that remained in the basket reached a constant weight, which was used to calculate gel content.

2.6 Compounding and Cross-Linking

Copolymer/cross-linking agent formulations were compounded through melt-mixing for 10 minutes at 120° C. using a Haake Minilab Micro Compounder and a string was extruded. The string was used to prepare plaques for cross-linking by first melting said string into a plaque in a preheated first press at 140° C. at above 5 bar for 5 min. The formed plaque was then removed from the first press and put into a second press with the same dimensions, wherein the second press which had been preheated to the desired crosslinking temperature (see Tables below). The plaque was subsequently crosslinked at the desired temperature at 25 bar for the desired time (see Tables below), resulting in a 1.25 mm thick crosslinked plaque. The crosslinked plaque was then removed from the second press at the desired crosslinking temperature and put into a water/ice bath to ensure a rapid cooling of the crosslinked plaque.

2.7 Tan δ and Conductivity

Measurements ware performed using a Novocontrol Alpha spectrometer in the frequency range of $10^{-2}$ to $10^7$ Hz, at different temperatures in the range 20-130° C. with an error of ±0.1° C., at atmospheric pressure and under nitrogen atmosphere. The sample cell consisted of two stainless steel electrodes 40 mm in diameter and the sample with a thickness of 0.1 mm. Each measurement was carried out six times, and average values were recorded. The complex conductivity $\sigma^* = \sigma' + i\sigma''$, the real part of which is used for the analysis herein, can be deducted from the complex dielectric permittivity $\varepsilon^*$ as $\sigma^* = i\omega\varepsilon_0\varepsilon^*$, where $\varepsilon_0$ is the permittivity of free space. Both permittivity and conductivity were obtained directly from the instrument. The DC conductivity is extracted from the real part of the conductivity, $\sigma'$, at the limit of very low frequencies. Only temperatures where a plateau in the spectra (i.e. frequency-independent $\sigma'$) is observed were considered for this analysis.

The dielectric loss tan(δ) can be derived by the ratio of the real and imaginary part of the permittivity according to the relationship tan $(\delta) = \varepsilon''/\varepsilon'$. The values of the dielectric loss used in this work were obtained at 56 Hz.

3. Results

In order to show the effects provided by the present invention, reference compositions (RE1-RE7) and compositions according to the invention (IE1-IE12) were prepared using the materials and the conditions below. The results are summarized in Tables 1-4, and will now be discussed in detail First, a series of compositions according to the present invention was prepared in order to evaluate cross-linking performance and visual appearance of the final cross-linked samples. The results are summarized in Table 1. The composition of RE1 comprises a first polymer (A), P1, comprising epoxy groups, as well as a titanate and a curing agent (bisphenol derivative, Ad3). The plaque samples prepared from the composition of RE1 have satisfactory cross-linking performance, i.e. <100% elongation and >75% gel content in 5 min at cross-linking temperatures of 180-220° C. However, the samples are coloured with a strong yellowish or even orange colour that in some applications may not be acceptable. In addition, the composition of RE1 requires presence of a catalyst and an additive, which makes the system more expensive and complex and requires special storage and handling conditions in order to avoid hydrolysis of the additive.

On the other hand, the compositions of IE1-IE4 are more simple systems that involves only 2 (IE1) or 3 (IE2-IE4) components in the form of pellets. The inventive compositions comprise a first olefin polymer (A), P1, comprising epoxy groups, and a second olefin polymer (B), P2, comprising methacrylic acid. Cross-linking performance of the compositions of IE1-IE4 is improved, as may be seen in Table 1, presenting hotset elongation of the inventive compositions compared to the composition of RE1. In addition, the cross-linked samples made from the inventive compositions are colourless.

IE14 and IE15 demonstrates that increased polarity of the first olefin polymer (A) improves cross-linking behaviour.

TABLE 1

|  | RE1 | IE1 | IE2 | IE3 | IE4 | IE14 | IE15 |
|---|---|---|---|---|---|---|---|
| P1 (A, wt %) | 96.5 | 60 | 33 | 40 | 50 | — | — |
| P2 (B, wt %) | — | 40 | 17 | 30 | 40 | 10 | 10 |
| P3 (C, wt %) | — | — | 50 | 30 | 10 | — | — |
| P4 (A, wt %) | — | — | — | — | — | 90 | — |
| P6 (A, wt %) | — | — | — | — | — | — | 90 |
| Ad3 (wt %) | 3 | — | — | — | — | — | — |
| Ti1 (wt %) | 0.5 | — | — | — | — | — | — |
| Cross-linking temperature (° C.) | 180 | 200 | 200 | 200 | 200 | 300 | 300 |
| Cross-linking time (min) | 5 | 5/10 | 5/10 | 5/10 | 5/10 | 5 | 5 |
| Gel Content (%, 5 min/10 min) | 85/— | 91/95 | >70/— | >70/— | >80/— | — | — |
| Hotset elongation (%, 5 min/10 min) | 63/— | 9/0 | 50/35 | 18/14 | 10/5 | >100 | <100 |
| Colour | yellow | colourless | colourless | colourless | colourless | | |

Next, cross-linking behaviour as well as dielectric loss of the compositions according to the present invention were investigated. The results are presented in Table 2.

As may be seen from Table 2, excellent tan δ values can be achieved for peroxide free compositions containing a certain degree of polarity through cross-linking of the epoxy ring through click chemistry-type reactions in the presence of different curing agents (RE2-RE5). Cross-linked compositions showed improved tan δ values compared with thermoplastics. This means that the polarity is locked and fixed into the polymer structure after cross-linking improving tan δ values.

The composition of IE5 is an ethylene polymer composition comprising the first polymer (A) produced in the autoclave reactor and the second polymer (B) comprising acrylic acid. Both IE6 and IE7 comprise compositions wherein the first polymer (A) is produced in a tubular reactor. In IE6, the second polymer (B) comprises acrylic acid functionalities, while in IE7, the second polymer (B) is a terpolymer comprising acrylic acid and tert-butyl acrylate.

Plaques were prepared from the compositions of IE5-IE7 according to the method described above, and cross-linked at 200° C. for 10 min achieving at least 80% gel content. Tan δ values were measured at several temperatures as described above. The compositions of IE5-IE7 exhibited excellent tan δ values especially at elevated temperatures, and also showed excellent cross-linking properties. Further, the composition of IE6, based on the epoxy-containing polymer (A) produced in a tubular reactor and the second polymer (B) comprising only acrylic acid units show exhibited outstanding tan δ values at 90° C., indicating that the first polymer (A) produced in a tubular reactor is preferred.

TABLE 2

|  | RE2 | RE3 | RE4 | RE5 | RE7 | IE5 |
|---|---|---|---|---|---|---|
| P1 (A, wt %) | 98.5 | 97.5 | 99 | 98 | 99.5 | 63 |
| P2 (B, wt %) |  |  |  |  | — | 37 |
| P3 (C, wt %) |  |  |  |  |  |  |
| P4 (A, wt %) | — | — | — | — | — | — |
| P5 (B, wt %) | — | — | — | — | — | — |
| P9 (C, wt %) |  |  |  |  |  |  |
| Ad1 (wt %) | 1 | — | 1 | — | — | — |
| Ad2 (wt %) | — | 2 | — | 2 | — | — |
| Ti1 (wt %) | 0.5 | 0.5 | — | — | 0.5 | — |
| Cross-linking temperature (° C.) | 200 | 200 | 200 | 200 | 200 | 200 |
| Cross-linking time (min) | 10 | 10 | 10 | 10 | 10 | 10 |
| Gel Content (%) | >80 | >80 | >50 | >50 | <50 | >80 |
| Tan δ (non-cross-linked) | $6.7 \cdot 10^{-3}$ | 0.02 | $5.0 \cdot 10^{-4}$ | $4.4 \cdot 10^{-4}$ |  | $1.25 \cdot 10^{-4}$ |
| Tan δ (cross-linked, 50° C.) |  |  |  |  | $1.3 \cdot 10^{-4}$ | $1.77 \cdot 10^{-4}$ |
| Tan δ (cross-linked, 70° C.) | $1.0 \cdot 10^{-4}$ | $6.9 \cdot 10^{-4}$ | $1.5 \cdot 10^{-4}$ | $1.6 \cdot 10^{-4}$ | $0.42 \cdot 10^{-4}$ | $0.60 \cdot 10^{-4}$ |
| Tan δ (cross-linked, 90° C.) |  |  |  |  | $0.92 \cdot 10^{-4}$ | $0.55 \cdot 10^{-4}$ |

|  | IE6 | IE7 | IE8 | IE9 | IE10 | IE11 |
|---|---|---|---|---|---|---|
| P1 (A, wt %) | — | — | 50 | 25 | 25 | 25 |
| P2 (B, wt %) | 30 | — | 50 |  | 25 | 25 |
| P3 (C, wt %) |  |  |  | 50 | 50 | 45 |
| P4 (A, wt %) | 70 | 70 | — |  |  |  |
| P5 (B, wt %) | — | 30 | — | 25 |  |  |
| P9 (C, wt %) |  |  |  |  |  | 5 |
| Ad1 (wt %) |  |  |  |  |  |  |
| Ad2 (wt %) | — | — | — |  |  |  |
| Ti1 (wt %) | — | — | — |  |  |  |
| Cross-linking temperature (° C.) | 200 | 200 | 200 | 200 | 200 | 200 |
| Cross-linking time (min) | 10 | 10 | 10 | 10 | 10 | 10 |
| Gel Content (%) | >80 | >80 | >80 | >80 | >80 | >80 |
| Tan δ (non-cross-linked) | 0.02 | $1.5 \cdot 10^{-4}$ |  |  |  |  |
| Tan δ (cross-linked, 50° C.) | $2.11 \cdot 10^{-4}$ | $1.75 \cdot 10^{-4}$ | $1.52 \cdot 10^{-4}$ | $1.52 \cdot 10^{-4}$ | $1.60 \cdot 10^{-4}$ | $1.88 \cdot 10^{-4}$ |
| Tan δ (cross-linked, 70° C.) | $0.67 \cdot 10^{-4}$ | $0.68 \cdot 10^{-4}$ | $0.68 \cdot 10^{-4}$ | $0.68 \cdot 10^{-4}$ | $0.068 \cdot 10^{-4}$ | $1.41 \cdot 10^{-4}$ |
| Tan δ (cross-linked, 90° C.) | $0.0067 \cdot 10^{-4}$ | $0.83 \cdot 10^{-4}$ | $2.68 \cdot 10^{-4}$ | $2.67 \cdot 10^{-4}$ | $0.61 \cdot 10^{-4}$ | $6.41 \cdot 10^{-4}$ |

The tan delta values reported above, especially those of IE6 are low. Without wishing to be limited by theory, it is envisaged that the absence of a curing agent helps reduce tan delta. Curing agents can often contain metals or highly polar substances that negatively affect the electrical properties of a material.

TABLE 3

|  | IE5 | IE12 | IE6 | IE7 |
|---|---|---|---|---|
| P1 (A, wt %) | 63 | 60 | — | — |
| P2 (B, wt %) | 37 | — | 30 | — |

TABLE 3-continued

|  | IE5 | IE12 | IE6 | IE7 |
|---|---|---|---|---|
| P4 (A, wt %) | — | — | 70 | 70 |
| P5 (B, wt %) | — | 40 | — | 30 |
| Cross-linking temperature (° C.) | 200 | 220 | 240 | 240 |
| Cross-linking time (min) | 5 | 5 | 5 | 5 |
| Gel Content (%) | 80 | 90 | 72 | 77 |
| Pre-cross-linking during extrusion | Yes, above 150° C. | Yes, above 150° C. | No | No |

Further, the effect of the manufacturing method of the first olefin polymer (A) on cross-linking properties of the ethylene polymer composition has been studied. The results are summarized in Table 3. The ethylene polymer composition of IE5 comprises the first olefin polymer (A) being produced in an autoclave. From the composition of IE5, tapes were extruded at 150° C. Extrusion temperature above 150° C. resulted in pre-cross-linking during extrusion. Precrosslinking was assessed by visual inspection of plaques. If dips, spots, bumps or other surface imperfections were observed, the sample was considered precross-linked. From the tapes extruded without precross-linking, plaques were made by compression moulding and cross-linked under the conditions specified in Table 3.

The ethylene polymer composition of IE12 comprises the first olefin polymer (A) being produced in an autoclave. Although the gel content for the cross-linked composition of IE12 was higher compared to IE5, indicating better cross-linking performance, the composition of IE12 exhibited pre-cross-linking during extrusion at temperatures above 150° C.

IE6 and IE7 comprises ethylene polymer compositions comprising the first olefin polymer (A) produced in a tubular reactor. No pre-cross-linking was observed in either case at temperatures higher than 150° C. under tape extrusion, and both compositions exhibited good cross-linking performance, indicated by gel content of 72 and 77% respectively. Without wishing to be bound by any theory, the more blocky nature of first olefin polymer (A) produced in tubular reactor slows down cross-linking speed thus resulting in absence of precross-linking.

Finally, studies were performed in order to investigate DC conductivity of the polymer composition according to the present invention. The results are shown in Table 4.

TABLE 4

|  | RE7 | IE5 | IE6 | IE7 | IE13 |
|---|---|---|---|---|---|
| P1 (A, wt %) | 99.5 | 63 | — | — | 30 |
| P2 (B, wt %) | — | 37 | 30 | — | 30 |
| P3 (C, wt %) |  |  |  |  | 40 |
| P4 (A, wt %) |  |  | 70 | 70 |  |
| P5 (B, wt %) | — | — | — | 30 |  |
| Ti1 (wt %) | 0.5 | — | — | — |  |
| Cross-linking temperature (° C.) | 200 | 200 | 200 | 200 | 200 |
| Cross-linking time (min) | 10 | 10 | 10 | 10 | 10 |
| Gel Content (%) | <50 | >80 | >80 | >80 | >80 |
| $\delta$ (S/cm, 70° C.) | $6.9 \cdot 10^{-16}$ | $1.8 \cdot 10^{-16}$ | $4.0 \cdot 10^{-17}$ | $6.6 \cdot 10^{-17}$ | $2.8 \cdot 10^{-16}$ |
| $\delta$ (S/cm, 90° C.) | $4.1 \cdot 10^{-15}$ | $1.6 \cdot 10^{-15}$ | $3.6 \cdot 10^{-16}$ | $3.4 \cdot 10^{-16}$ | $16 \cdot 10^{-16}$ |
| $\delta$ (S/cm, 110° C.) | $2.2 \cdot 10^{-14}$ | $1.2 \cdot 10^{-14}$ | $7.0 \cdot 10^{-15}$ | $6.3 \cdot 10^{-15}$ | — |
| $\delta$ (S/cm, 130° C.) | $5.7 \cdot 10^{-14}$ | $3.9 \cdot 10^{-14}$ | $3.3 \cdot 10^{-14}$ | $2.4 \cdot 10^{-14}$ | — |

As may be seen in Table 4, the compositions of the IE5-IE7 exhibit lower DC conductivities compared to the compositions of RE7. In particular, the composition of IE7, wherein the polymers produced in tubular reactor are used, shows the lowest DC conductivity values.

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

The invention claimed is:

1. A cable comprising at least one layer comprising a cross-linkable polyolefin composition comprising:
   20 wt % to 95 wt % based on the total amount of said polyolefin composition of a first olefin polymer (A) comprising a first comonomer comprising epoxy groups, and
   5 to 60 wt % based on the total amount of said polyolefin composition of a second olefin polymer (B) comprising a second comonomer comprising carboxylic acid groups and/or precursor thereof;
   wherein the cross-linkable polyolefin composition is substantially free of curing agents.

2. The cable according to claim 1, wherein said first comonomer comprising epoxy groups is aliphatic glycidyl methacrylate comonomer.

3. The cable according to claim 1, wherein the amount of said first comonomer is at least 0.1 wt %, or at least 0.5 wt %, or at least 1 wt %, based on the amount of said first olefin polymer (A).

4. The cable according to claim 1, wherein the amount of said first comonomer is 20 wt % or less, or 15 wt % or less, or 10 wt % or less, or 5 wt % or less, based on the amount of said first olefin polymer (A).

5. The cable according to claim 1, wherein said second comonomer comprising carboxylic acid groups is acrylic acid comonomer.

6. The cable accordingly to claim 1, wherein the amount of said second comonomer is from 0.1 to 20 wt %, based on the amount of said second olefin polymer (B).

7. The cable accordingly to claim 1, wherein said cross-linkable polyolefin composition further comprises a third olefin polymer (C).

8. A cable comprising at least one layer comprising a cross-linked polyolefin composition cured in the absence of curing agents comprising:
   20 wt % to 95 wt % based on the total amount of said polyolefin composition of a first olefin polymer (A) comprising a first comonomer comprising epoxy groups, and
   5 to 60 wt % based on the total amount of said polyolefin composition of a second olefin polymer (B) comprising a second comonomer comprising carboxylic acid groups and/or a precursor thereof.

9. The cable according to claim 8, wherein said cross-linked polyolefin composition has hotset elongation measured according to IEC 60811-2-1 of below 175%.

10. The cable according to claim 8, wherein the gel content of the cross-linked polyolefin composition is at least 50%, or at least 60%, or at least 70%.

* * * * *